US012500626B2

(12) United States Patent
Wang

(10) Patent No.: US 12,500,626 B2
(45) Date of Patent: Dec. 16, 2025

(54) SYSTEM FOR PLAYING VOICE, METHOD FOR CONFIGURING VOICE PLAYING TIMBRE AND RELATED APPARATUS

(71) Applicant: Beijing Baidu Netcom Science Technology Co., Ltd., Beijing (CN)

(72) Inventor: Zhongyi Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 595 days.

(21) Appl. No.: 17/895,154

(22) Filed: Aug. 25, 2022

(65) Prior Publication Data
US 2022/0407562 A1 Dec. 22, 2022

Related U.S. Application Data

(63) Continuation of application No. PCT/CN2021/141962, filed on Dec. 28, 2021.

(30) Foreign Application Priority Data

May 25, 2021 (CN) .......................... 202110570865.1

(51) Int. Cl.
*H04B 5/20* (2024.01)
(52) U.S. Cl.
CPC ...................... *H04B 5/20* (2024.01)
(58) Field of Classification Search
CPC ......... H04B 5/20; G10L 13/033; G10L 13/04; G11B 20/10; H04W 4/80
(Continued)

(56) References Cited

U.S. PATENT DOCUMENTS 9,985,692 B2    5/2018  Cho et al.
10,635,377 B2   4/2020  Lee et al.
(Continued)

FOREIGN PATENT DOCUMENTS

CN      1790478 A     6/2006
CN    202838710 U     3/2013
(Continued)

OTHER PUBLICATIONS

International Search Report for International Application No. PCT/CN2021/141962 (English translation unavailable), mailed Apr. 11, 2021 (5 pages).

*Primary Examiner* — Eugene Yun
(74) *Attorney, Agent, or Firm* — ICE MILLER LLP; Justin D. Swindells

(57) ABSTRACT

The present disclosure provides a system for playing a voice, a method and apparatus for configuring a voice playing timbre, an electronic device, a computer readable storage medium and a computer program product, and relates to the technical fields of voice playing and near field communication. The system includes: a near field communication information storage, configured to store timbre configuration information that can be read through a near field communication mechanism; and a voice playing body provided with a near field communication scanner, configured to read the timbre configuration information in the near field communication information storage through the near field communication scanner, and play a voice content based on a timbre corresponding to the timbre configuration information.

20 Claims, 2 Drawing Sheets

100

101

103

1021

1022

1023

(58) Field of Classification Search
USPC ........................................................ 455/41.1
See application file for complete search history.

(56) References Cited

U.S. PATENT DOCUMENTS

| | | | |
|---|---|---|---|
| 2010/0198591 A1 | 8/2010 | Yoshizawa | |
| 2012/0173318 A1* | 7/2012 | Lee | G06Q 30/0267 |
| | | | 235/375 |
| 2016/0375373 A1* | 12/2016 | Fassbender | A63H 3/28 |
| | | | 446/397 |

FOREIGN PATENT DOCUMENTS

| | | |
|---|---|---|
| CN | 106452511 A | 2/2017 |
| CN | 106878870 A | 6/2017 |
| CN | 107195289 A | 9/2017 |
| CN | 107578764 A | 1/2018 |
| CN | 108319674 A | 7/2018 |
| CN | 109979430 A | 7/2019 |
| CN | 111276123 A | 6/2020 |
| CN | 111367490 A | 7/2020 |
| CN | 111524501 A | 8/2020 |
| CN | 112289289 A | 1/2021 |
| CN | 213100809 U | 5/2021 |
| CN | 113257223 A | 8/2021 |
| JP | 6-089098 | 3/1994 |
| JP | 2004294813 A | 10/2004 |
| JP | 2014194600 A | 10/2014 |
| JP | 2019109278 A | 7/2019 |
| KR | 20170065904 A | 6/2017 |
| KR | 20190008502 A | 1/2019 |
| KR | 102036859 B1 | 10/2019 |
| WO | WO 2020/050540 A1 | 3/2020 |

\* cited by examiner 101  102

101

103

SYSTEM FOR PLAYING VOICE, METHOD FOR CONFIGURING VOICE PLAYING TIMBRE AND RELATED APPARATUS

CROSS-REFERENCE TO RELATED APPLICATIONS

This application is a continuation of International Application No. PCT/CN2021/141962, filed on Dec. 28, 2021, which claims priority to Chinese Patent Application no. 202110570865.1, filed on May 25, 2021, and titled "SYSTEM FOR PLAYING VOICE, METHOD FOR CONFIGURING VOICE PLAYING TIMBRE AND RELATED APPARATUS", both of which are hereby incorporated by reference in their entireties.

TECHNICAL FIELD

The present disclosure relates to the technical field of data processing, in particular to the technical fields of voice playing and near field communication, and more particularly, to a system for play a voice, a method and apparatus for configuring a voice playing timbre, an electronic device, a computer readable storage medium and a computer program product.

BACKGROUND

Existing intelligent voice playing devices acquire configuration information in a relatively simple way based on human-computer interaction. This simple way may usually include: downloading from servers or receiving from other storage devices, corresponding configuration information according to users' voice instructions or button instructions, etc.

SUMMARY

Embodiments of the present disclosure propose a system for play a voice, a method and apparatus for configuring a voice playing timbre, an electronic device, a computer readable storage medium and a computer program product.

In a first aspect, embodiments of the present disclosure provide a system for playing a voice, comprising: a near field communication information storage, configured to store timbre configuration information that can be read through a near field communication mechanism; and a voice playing body provided with a near field communication scanner, configured to read the timbre configuration information in the near field communication information storage through the near field communication scanner, and play a voice content based on a timbre corresponding to the timbre configuration information.

In a second aspect, embodiments of the present disclosure provide a method for configuring a voice playing timbre in the system for playing a voice provided by any one of embodiments of the present disclosure of the first aspect, comprising: generating, in response to reading multiple pieces of different timbre configuration information within a preset time period, fusion timbre configuration information based on the multiple pieces of timbre configuration information; and playing a voice content based on a fusion timbre corresponding to the fusion timbre configuration information.

In a third aspect, embodiments of the present disclosure provide an apparatus for configuring a voice playing timbre in the system playing a voice provided by any one of embodiments of the present disclosure of the first aspect, comprising: a timbre fusion unit, configured to generate, in response to reading multiple pieces of different timbre configuration information within a preset time period, fusion timbre configuration information based on the multiple pieces of timbre configuration information; and a voice playing unit, configured to play a voice content based on a fusion timbre corresponding to the fusion timbre configuration information.

In a fourth aspect, embodiments of the present disclosure provide an electronic device, comprising: one or more processors; and a memory, storing one or more programs, wherein the one or more programs, when executed by the one or more processors, cause the one or more processors to implement the method for configuring a voice playing timbre provided by the second aspect.

In a fifth aspect, embodiments of the present disclosure provide a computer-readable medium, storing a computer program thereon, wherein the program, when executed by a processor, causes the processor to implement the method for configuring a voice playing timbre provided by the second aspect.

In a sixth aspect, an embodiment of the present disclosure provides a computer program product, comprising a computer program, wherein the computer program, when executed by a processor, implements the method for configuring a voice playing timbre provided by the second aspect.

The system for playing a voice provided by embodiments of the present disclosure includes: a near field communication information storage, configured to store timbre configuration information that can be read through a near field communication mechanism; and a voice playing body provided with a near field communication scanner, configured to read the timbre configuration information in the near field communication information storage through the near field communication scanner, and present voice playing corresponding to the timbre configuration information.

It should be understood that contents described in this section are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

After reading detailed descriptions of non-limiting embodiments with reference to the following accompanying drawings, other features, objectives, and advantages of the present disclosure will become more apparent.

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skilled in the art should realize that various changes and modifications can be made to the embodiments described here without departing from the scope and spirit of the present disclosure. Similarly, for clearness and conciseness, descriptions of well-known functions and structures are omitted in the following description. It should be noted that the embodiments of the present disclosure and features in the embodiments may be combined with each other on a non-conflict basis.

In the technical solution of the present disclosure, the acquisition, storage and application of the involved user personal information (for example, a timbre corresponding to timbre configuration information is the user's personal timbre), etc., all comply with the relevant laws and regulations, necessary security measures have been taken, and do not violate public order and good customs.

Figure 1:
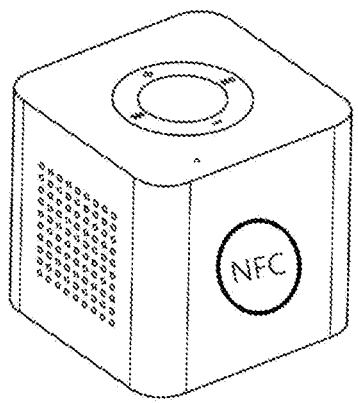
FIG. 1 is a schematic structural diagram of a system for playing a voice according to an embodiment of the present disclosure.
Figure 1:
Figure 1:

FIG. 1 shows a schematic structural diagram of a system 100 for playing a voice.

The system 100 for playing a voice includes: a voice playing body 101, and a near field communication information storage 102. The near field communication information storage 102 is configured to store timbre configuration information that can be read through a near field communication mechanism; and the voice playing body 101 is provided with a near field communication scanner, configured to read the timbre configuration information in the near field communication information storage through the near field communication scanner, and play a voice content based on a timbre corresponding to the timbre configuration information.

The timbre configuration information is configuration information used to instruct the voice playing body 101 to adjust the timbre for playing the voice content to a target timbre. For example, when the timbre for playing the voice content is a timbre of a cartoon character A, configuration may be made based on a timbre configuration corresponding to the timbre of the cartoon character A, that is, sound output parameters may be adjusted to be the same as sound parameters of the cartoon character A to restore the timbre of the cartoon character A. Typically, the sound parameters include information such as a treble amplitude, a bass amplitude, an audio vibration frequency. Of course, types of timbres are usually not limited to real-life people timbres, and may also include virtual timbres, synthetic timbres, or the like.

The voice content played by the voice playing body may be a voice content that is acquired in real time and passed in by a user, or may be a voice content acquired from a server or a storage medium of a non-local terminal in advance through network transmission, etc., or may also be text information acquired in the above ways, and then a voice content may be obtained by converting the text information by means of text-to-speech (TTS), etc.

For example, a user may issue an instruction to a voice player body 101 in advance through a terminal device, and directly operate the voice playing body 101 to acquire text information of a to-be-played voice content. After the user sends timbre configuration information to the voice playing body 101 using the near field communication information storage storing the timbre configuration information that can be read through the near field communication mechanism, the voice playing body 101 may read the timbre configuration information in the near field communication information storage through the near field communication scanner, and configure the corresponding timbre based on the timbre configuration information, then convert the above text information through TTS to obtain the voice content, and finally complete playing of the voice content according to the configured timbre.

In some alternative embodiments, the system for playing a voice further includes a voice package storage server. The voice package storage server is connected in communication with the voice playing body, and may be configured to return, based on a download request of the voice playing body, a voice package corresponding to the download request, in order to expand diversity of the voice content, and meet the needs of users.

In addition, considering that an information storage capacity of the near field communication information storage 102 is generally low. If a data volume of the specific timbre configuration information is large and exceeds an effective storage upper limit of the near field communication information storage 102, the near field communication information storage 102 may be controlled to only store an index or a link that can further query the specific timbre configuration information to the near field communication scanner provided in the voice playing body 101, acting as "pseudo-timbre configuration information" that can help to acquire the real timbre configuration information.

Near Field Communication, abbreviated as NFC, is an emerging technology. Devices using the NFC technology (such as mobile phones) may exchange data when they are close to each other. The technology evolved from the integration of contactless radio frequency identification (RFID) and interconnection technologies. By integrating the functions of inductive card reader, inductive card and point-to-point communication on a single chip, applications such as mobile payment, electronic ticketing, access control, mobile identification, and anti-counterfeiting may be implemented using mobile terminals. In addition to the use of NFC using RFID, infrared, Bluetooth and other technologies that can exchange data in a short distance may also be used in the near field communication. Compared with Bluetooth and infrared, a cost of near field communication based on NFC chip is relatively low. In this regard, the near field communication information storage is a near field communication chip (NFC chip) that stores the timbre configuration information.

The present disclosure applies the NFC technology to the field of voice playing, and uses the near field communication information storage that independently stores the timbre configuration information to conveniently adjust the timbre for playing the voice content presented by the voice playing body.

Specifically, the voice playing body 101 may be embodied as an apparatus for playing a voice without other functions, or may be embodied as a smart speaker, a smart mobile terminal, or the like integrated with voice playing functional components.

The system for playing a voice provided by the present embodiment independently stores the timbre configuration information in the near field communication information storage, so that the voice playing body may read the timbre configuration information from the near field communication information storage through a near field recognition mechanism at a distance, then configure the corresponding timbre based on the timbre configuration information, and play the voice content based on the timbre, in order to realize flexible changes of timbres by replacing the storage storing different timbre configuration information.

Figure 2:
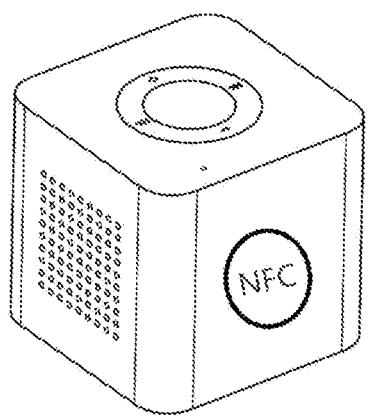
FIG. 2 is a schematic structural diagram of another system for playing a voice according to an embodiment of the present disclosure.
Figure 2:
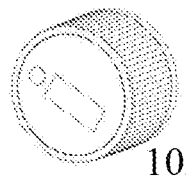
Figure 2:
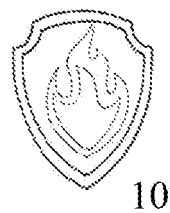
Figure 2:
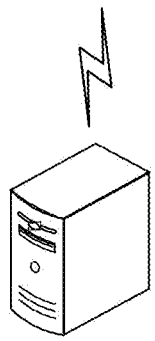
Figure 2:
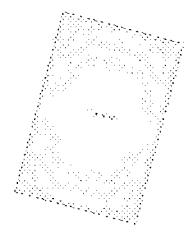

On the basis of the above embodiment, the present disclosure also provides a schematic diagram of another system for playing a voice through FIG. 2.

As shown in FIG. 2, considering the availability of the near field communication information storage, a variety of carriers may also be set for the near field communication information storage combining an actual situation, for example, a bottle cap 1021, a badge 1022, and a card 1023 as shown in FIG. 2. Using an NFC chip as the specific near field communication information storage as an example, the NFC chip storing the timbre configuration information may be embedded in the bottle cap 1021, the badge 1022, or the card 1023 to protect data stored in the NFC chip by means of the carrier having larger surface area and stronger material properties. In addition to several smaller-sized carriers such as bottle caps, badges, cards, or medals, some larger-sized carriers may also be used, such as toys, boxes, or bases. The size and shape of the carrier are not limited herein, and may be flexibly selected according to actual needs.

It should be noted that when the near field communication information storage is the NFC chip, the corresponding scanner may read the information therein from the NFC chip without supplying power to the NFC chip, so the corresponding carrier does not need to be provided with corresponding power supply components. However, if the technology used in the near field communication information storage is Bluetooth or infrared technology, it is also necessary to add corresponding power supply components according to actual needs.

In addition, a timbre storage server 103 is also provided in FIG. 2, and the timbre storage server 103 is connected in communication with the voice playing body 101 and configured to return, based on a download request of the voice playing body, target timbre configuration information corresponding to the download request. That is, a function of the timbre storage server 103 is to acquire the real, complete timbre configuration information based on the read "pseudo-timbre configuration information" when the voice playing body cannot directly read the complete timbre configuration information from the near field communication information storage 102, and then complete timbre configuration based on the received target timbre configuration information, and perform corresponding voice playing.

On the basis of any of the above embodiments, in order to store the near field communication information storage 102 and maintain a required near field communication distance, the voice playing body 101 may also be provided with an opening for placing, accommodating or wrapping the near field communication information storage 102, and a shape of the opening corresponds to the shape of the carrier in which the near field communication information storage 102 is embedded. For example, when the carrier of the near field communication information storage 102 is a coin-shaped plastic medal, the voice playing body 101 may be provided with a coin-shaped grid to place the coin-shaped plastic medal, or may be provided with an interior space for the coin-shaped plastic medal to be put in, or the like.

In addition to the above opening design, the near field communication information storage may be absorbed on an outer surface of the voice playing body 101 by magnetic attraction, that is, the voice playing body 101 and the near field communication information storage 102 are respectively provided with different magnetic poles that can attract each other, so that the near field communication information storage 102 may be adsorbed on the outer surface of the voice playing body 101 by magnetic force. The near field communication information storage 102 may also be adsorbed inside the voice playing body 101 based on a setting position of the magnetic poles.

On the basis of any of the above embodiments, in order to avoid a configuration information reading interference caused by possible simultaneous existence of multiple near field communication information storages 102 at the near field communication distance, the voice playing body 101 may also be provided with a shield storage box (neither shown in FIGS. 1 and 2), and the shield storage box is configured to block the near field communication scanner from reading the timbre configuration information stored in the near field communication information storage in space inside the box. For example, the shield storage box may be made of a particular material or a particular weaving approach of the material that can block signal transmission.

The previous embodiment of providing the shield storage box is aimed at the scenario where only one near field communication information storage 102 exists to read the configuration information at the near field communication distance, that is, an ability to process different configuration information read from different near field communication information storages 102 respectively is not supported in this scenario. However, in some scenarios that support the ability to process different configuration information read from different near field communication information storages 102, the different timbre configuration information read from the different near field communication information storages 102 respectively may also be fused to obtain fusion timbre configuration information. The fusion timbre configuration information may be fusion timbre configuration information that is completely different from any timbre configuration information, which is generated by superimposing, replacing, and other operations based on the different timbre configuration information, or may be obtained by configuring the acquired multiple pieces of timbre configuration information according to a preset configuration rule, and a part of the complete voice content is played by using timbres corresponding to the different timbre configuration information respectively.

For example, when the timbre configuration information stored in a first near field communication information storage corresponds to a soprano timbre, and the timbre configuration information stored in a second near field communication information storage corresponds to an alto timbre, the soprano timbre and the alto timbre may be fused, in order to obtain a new fusion timbre. During the fusion, configuration may also be performed according to a predetermined weighting rule to obtain a variety of different fusion timbres. The weighting rule may be adjusted proportionally according to actual needs, that is, under the same timbre combination, different fusion timbre results may be obtained according to different corresponding weighting rules during fusion, so that richer timbres may be obtained.

For example, a to-be-played voice content is a story book, and a plurality of different characters A, B, C are set in the story book. The timbre configuration information stored in the first near field communication information storage corresponds to the soprano timbre, the timbre configuration information stored in the second near field communication information storage corresponds to the alto timbre, and the timbre configuration information stored in a third near field communication information storage corresponds to a bass timbre. After assigning the soprano timbre, the alto timbre, and the bass timbre to lines corresponding to the above characters A, B, and C accordingly, full of the story book is played, so that different playing timbres are used in the same piece of voice content to achieve effects such as multi-character and multi-scenario, and a play effect of the voice content is improved.

Figure 3:
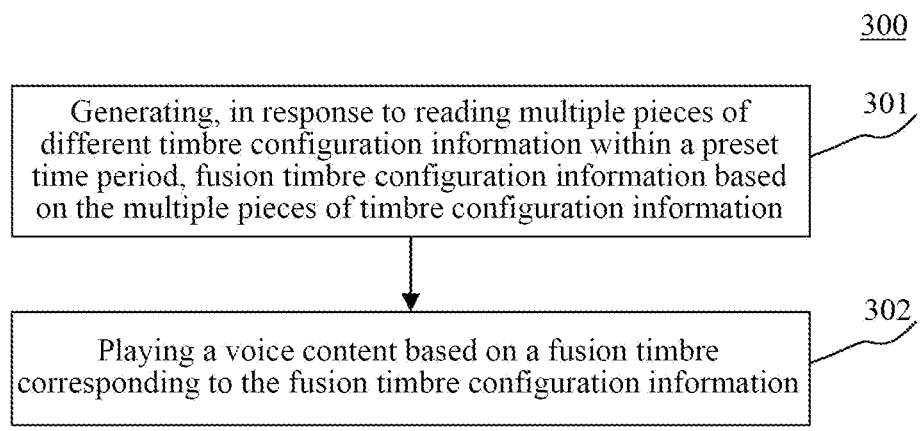
FIG. 3 is a flowchart of a method for configuring a voice playing timbre according to an embodiment of the present disclosure.

A specific implementation may refer to a flowchart as shown in FIG. 3, FIG. 3 is a flowchart of a method for configuring a voice playing timbre according to an embodiment of the present disclosure, where a flow 300 includes the following steps:

Step 301: generating, in response to reading multiple pieces of different timbre configuration information within a preset time period, fusion timbre configuration information based on the multiple pieces of timbre configuration information.

The purpose of this step is to read the multiple pieces of different timbre configuration information within the preset time period, and fuse the acquired multiple pieces of timbre configuration information to obtain the fusion timbre configuration information by an executing body (for example, the voice playing body 101 as shown in FIG. 1) of the method for configuring a voice playing timbre, so as to obtain a corresponding fusion timbre based on the fusion timbre configuration information, and use the fusion timbre to play a voice content.

The multiple pieces of different timbre configuration information usually come from different near field communication information storages 102, but some special cases in which the multiple pieces of different timbre configuration information are stored in one near field communication information storage 102 are not excluded. The preset time period may be set to 5 seconds, 10 seconds or a custom duration. Preset time periods of different durations may also be preset, and the above weighting rule may be determined based on a difference in an interval from the reading time of the previous piece of timbre configuration information, to obtain a corresponding fusion mechanism. For example, after two pieces of different timbre configuration information are continuously acquired, it may be determined that a fusion weight relationship between the first timbre configuration information and the second timbre configuration information is 2:1, if the reading interval is less than 5 seconds, when generating the fusion timbre configuration information; it may be determined that the fusion weight relationship between the first timbre configuration information and the second timbre configuration information is 1:1, if the reading interval is greater than 5 seconds and less than 10 seconds, when generating the fusion timbre configuration information; or it may be determined that the fusion weight relationship between the first timbre configuration information and the second timbre configuration information is 1:2, if the reading interval is greater than 10 seconds, when generating the fusion timbre configuration information.

Step 302: playing a voice content based on a fusion timbre corresponding to the fusion timbre configuration information.

In addition, in order to enhance users' initiative to continuously acquire near field communication information storages storing new timbre configuration information, in response to the timbre configuration information not being read for a continuous preset duration (that is, the near field communication information storage 102 storing the timbre configuration information is not within the near field communication distance) by the executing body (for example, the voice playing body 101 as shown in FIG. 1), voice playing corresponding to default timbre configuration information may be presented, and voice playing based on the timbre corresponding to the timbre configuration information read from the previous near field communication information storage 102 is no longer continued.

For example, a user previously obtained a commemorative badge N of a certain anime character released in a limited edition, and the commemorative badge N records a network link to timbre configuration information of a voice actor A corresponding to the anime character. After acquiring the badge N, the user may place it next to a smart speaker that supports voice playing in his/her home, so that the smart speaker can read from the badge N through the near field communication technology and acquire the link to the timbre configuration information corresponding to a timbre of the voice actor A. The smart speaker downloads the timbre configuration information corresponding to the timbre of the voice actor A from a storage server based on the link, and controls functional components of voice playing to configure based on the timbre configuration information, and uses the timbre of the voice actor A to play a voice content.

But afterwards, one day the badge N was accidentally discarded by the user, the smart speaker failed to continuously detect the badge N within the near field communication distance for two consecutive weeks, so the smart speaker would no longer continue playing the voice content based on the timbre of the voice actor A. Instead, the smart speaker configured the timbre to be a default timbre.

Further, in order to prevent the user from tampering with local data of the smart speaker (voice playing body) through illegal means, by modifying the timbre configuration information corresponding to the default timbre to other historically acquired timbre configuration information, and changing the local default timbre to the other historically acquired timbre configuration information, it may also be set that the smart speaker deletes the timbre configuration information configured in historical data after a preset time, or it may be set that a data write permission of the smart speaker is for a specific user.

Figure 4:
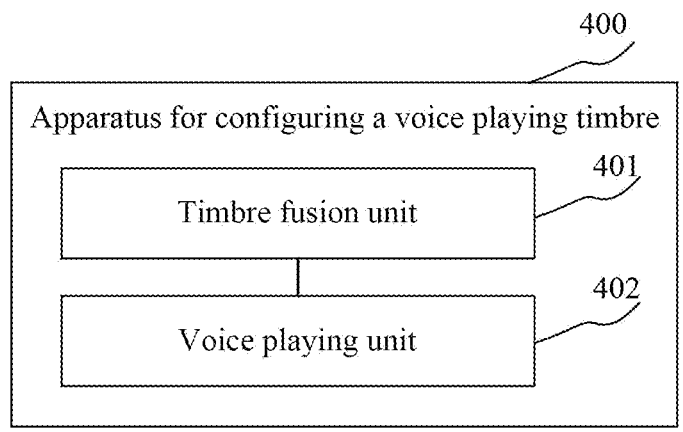
FIG. 4 is a structural block diagram of an apparatus for configuring a voice playing timbre according to an embodiment of the present disclosure.

As an implementation of the method shown in FIG. 3, the present disclosure also provides an embodiment of an apparatus for configuring a voice playing timbre through FIG. 4, and the apparatus embodiment corresponds to the method embodiment shown in FIG. 3, and the apparatus may be applied to various electronic devices.

As shown in FIG. 4, an apparatus 400 for configuring a voice playing timbre of the present embodiment may include: a timbre fusion unit 401, and a voice playing unit 402. The timbre fusion unit 401 is configured to generate, in response to reading multiple pieces of different timbre configuration information within a preset time period, fusion timbre configuration information based on the multiple pieces of timbre configuration information. The voice playing unit 402 is configured to play a voice content based on a fusion timbre corresponding to the fusion timbre configuration information.

In the present embodiment, in the apparatus 400 for configuring a voice playing timbre, for the specific processing and the technical effects of the timbre fusion unit 401 and the voice playing unit 402, reference may be made to the relevant descriptions of the steps 301-302 in the corresponding embodiment of FIG. 3 respectively, and detailed description thereof will be omitted.

In some alternative implementations of the present embodiment, the apparatus 400 for configuring a voice playing timbre may further include: a fallback default unit, configured to modify, in response to the timbre configuration information not being read for a continuous preset duration, the playing timbre to a default timbre.

According to an embodiment of the present disclosure, the present disclosure also provides an electronic device, the electronic device including: at least one processor; and a memory communicatively connected to the at least one processor; where, the memory stores instructions executable by the at least one processor, and the instructions, when executed by the at least one processor, cause the at least one processor to implement the method for configuring a voice playing timbre according to any of the above contents.

According to an embodiment of the present disclosure, the present disclosure also provides a readable storage medium storing computer instructions, where, the computer instructions are used to cause the computer to perform the method for configuring a voice playing timbre according to any of the above contents.

An embodiment of the present disclosure provides a computer program product, the computer program, when executed by a processor, implements the method for configuring a voice playing timbre according to any of the above contents.

Figure 5:
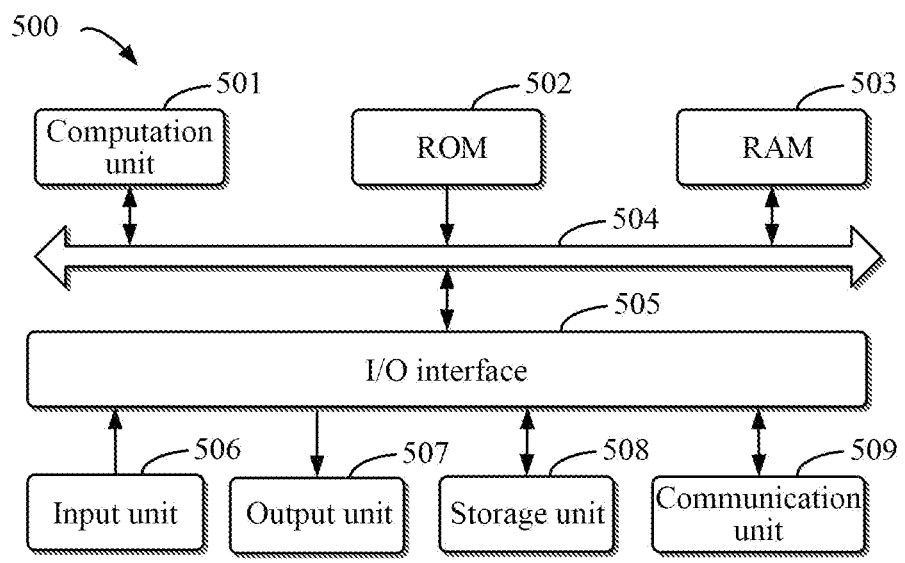
FIG. 5 is a schematic structural diagram of an electronic device suitable for performing the method for configuring a voice playing timbre according to an embodiment of the present disclosure.

FIG. 5 illustrates a schematic block diagram of an example electronic device 500 that may be used to implement embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The parts shown herein, their connections and relationships, and their functions are merely examples, and are not intended to limit the implementation of the present disclosure described and/or claimed herein.

As shown in FIG. 5, the device 500 includes a computation unit 501, which may perform various appropriate actions and processing, based on a computer program stored in a read-only memory (ROM) 502 or a computer program loaded from a storage unit 508 into a random access memory (RAM) 503. In the RAM 503, various programs and data required for the operation of the device 500 may also be stored. The computation unit 501, the ROM 502, and the RAM 503 are connected to each other through a bus 504. An input/output (I/O) interface 505 is also connected to the bus 504.

A plurality of parts in the device 500 are connected to the I/O interface 505, including: an input unit 506, for example, a keyboard and a mouse; an output unit 507, for example, various types of displays and speakers; the storage unit 508, for example, a disk and an optical disk; and a communication unit 509, for example, a network card, a modem, or a wireless communication transceiver. The communication unit 509 allows the device 500 to exchange information/data with other devices over a computer network such as the Internet and/or various telecommunication networks.

The computation unit 501 may be various general-purpose and/or dedicated processing components having processing and computing capabilities. Some examples of the computation unit 501 include, but are not limited to, central processing unit (CPU), graphics processing unit (GPU), various dedicated artificial intelligence (AI) computing chips, various computation units running machine learning model algorithms, digital signal processors (DSP), and any appropriate processors, controllers, microcontrollers, etc.

The computation unit 501 performs the various methods and processes described above, such as a method for configuring a voice playing timbre. For example, in some embodiments, the method for configuring a voice playing timbre may be implemented as a computer software program, which is tangibly included in a machine readable medium, such as the storage unit 508. In some embodiments, part or all of the computer program may be loaded and/or installed on the device 500 via the ROM 502 and/or the communication unit 509. When the computer program is loaded into the RAM 503 and executed by the computation unit 501, one or more steps of the method for configuring a voice playing timbre described above may be performed. Alternatively, in other embodiments, the computation unit 501 may be configured to perform the method for configuring a voice playing timbre by any other appropriate means (for example, by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, specific-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, also known as a cloud computing server or a cloud host. It is a host product in the cloud computing service system, to solve the difficulties of defects of large management and weak business expansion in traditional physical host and virtual private server (VPS) services.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A system for playing a voice, comprising:
   a near field communication information storage, configured to store timbre configuration information that can be read through a near field communication mechanism; and
   a voice playing body provided with a near field communication scanner, configured to read the timbre configuration information in the near field communication information storage through the near field communication scanner, and play a voice content based on a timbre corresponding to the timbre configuration information, wherein the voice playing body is further configured to:
   generate, in response to reading multiple pieces of different timbre configuration information within a preset time period, fusion timbre configuration information based on the multiple pieces of timbre configuration information; and play a voice content based on a fusion timbre corresponding to the fusion timbre configuration information.

2. The system for playing a voice according to claim 1, wherein the near field communication information storage is a near field communication chip that stores the timbre configuration information.

3. The system for playing a voice according to claim 2, wherein the near field communication chip is embedded in a medal, a badge, a card or a bottle cap.

4. The system for playing a voice according to claim 1, wherein the voice playing body is provided with an opening for placing, accommodating or wrapping the near field communication information storage, and a shape of the opening corresponds to a shape of a carrier in which the near field communication information storage is embedded.

5. The system for playing a voice according to claim 1, wherein the near field communication information storage is absorbed on an outer surface of the voice playing body by magnetic attraction.

6. The system for playing a voice according to claim 1, wherein the voice playing body is provided with a shield storage box, and the shield storage box is configured to block the near field communication scanner from reading the timbre configuration information stored in the near field communication information storage in space inside the box.

7. The system for playing a voice according to claim 1, wherein the system further comprises:
   a voice package storage server, connected in communication with the voice playing body, and configured to return, based on a download request of the voice playing body, a voice package corresponding to the download request.

8. A method for configuring a voice playing timbre, applied to a system for playing a voice, comprising:
   generating, in response to reading multiple pieces of different timbre configuration information within a preset time period, fusion timbre configuration information based on the multiple pieces of timbre configuration information; and
   playing a voice content based on a fusion timbre corresponding to the fusion timbre configuration information;
   wherein the system comprises:
   a near field communication information storage, configured to store timbre configuration information that can be read through a near field communication mechanism; and
   a voice playing body provided with a near field communication scanner, configured to read the timbre configuration information in the near field communication information storage through the near field communication scanner, and to play a voice content based on a timbre corresponding to the timbre configuration information.

9. The method according to claim 8, further comprising:
   modifying, in response to the timbre configuration information not being read for a continuous preset duration, the voice playing timbre to a default timbre.

10. The method according to claim 8, wherein the near field communication information storage is a near field communication chip that stores the timbre configuration information.

11. The method according to claim 10, wherein the near field communication chip is embedded in a medal, a badge, a card or a bottle cap.

12. The method according to claim 8, wherein the voice playing body is provided with an opening for placing, accommodating or wrapping the near field communication information storage, and a shape of the opening corresponds to a shape of a carrier in which the near field communication information storage is embedded.

13. The method according to claim 8, wherein the near field communication information storage is absorbed on an outer surface of the voice playing body by magnetic attraction.

14. The method according to claim 8, wherein the voice playing body is provided with a shield storage box, and the shield storage box is configured to block the near field communication scanner from reading the timbre configuration information stored in the near field communication information storage in space inside the box.

15. The method according to claim 8, wherein the system further comprises:
a voice package storage server, connected in communication with the voice playing body, and configured to return, based on a download request of the voice playing body, a voice package corresponding to the download request.

16. An electronic device, comprising:
at least one processor; and
a memory communicatively connected to the at least one processor; wherein,
the memory stores instructions executable by the at least one processor, and the instructions, when executed by the at least one processor, cause the at least one processor to perform operations for configuring a voice playing timbre, applied to a system for playing a voice, the operations comprising:
generating, in response to reading multiple pieces of different timbre configuration information within a preset time period, fusion timbre configuration information based on the multiple pieces of timbre configuration information; and
playing a voice content based on a fusion timbre corresponding to the fusion timbre configuration information,
wherein the system comprises:
a near field communication information storage, configured to store timbre configuration information that can be read through a near field communication mechanism; and
a voice playing body provided with a near field communication scanner, configured to read the timbre configuration information in the near field communication information storage through the near field communication scanner, and to play a voice content based on a timbre corresponding to the timbre configuration information.

17. The electronic device according to claim 16, wherein the operations further comprise:
modifying, in response to the timbre configuration information not being read for a continuous preset duration, the voice playing timbre to a default timbre.

18. The electronic device according to claim 16, wherein the near field communication information storage is a near field communication chip that stores the timbre configuration information.

19. The electronic device according to claim 18, wherein the near field communication chip is embedded in a medal, a badge, a card or a bottle cap.

20. The electronic device according to claim 16, wherein the voice playing body is provided with an opening for placing, accommodating or wrapping the near field communication information storage, and a shape of the opening corresponds to a shape of a carrier in which the near field communication information storage is embedded.

* * * * *